(12) United States Patent
Hattori et al.

(10) Patent No.: US 12,710,042 B2
(45) Date of Patent: Aug. 18, 2026

(54) ELECTRIC COMPRESSOR

(71) Applicant: KABUSHIKI KAISHA TOYOTA JIDOSHOKKI, Kariya (JP)

(72) Inventors: Yuya Hattori, Kariya (JP); Masaki Shibata, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 14 days.

(21) Appl. No.: 18/606,501

(22) Filed: Mar. 15, 2024

(65) Prior Publication Data

US 2024/0318655 A1 Sep. 26, 2024

(30) Foreign Application Priority Data

Mar. 24, 2023 (JP) ................................ 2023-048902

(51) Int. Cl.
*H02K 1/18* (2006.01)
*F04C 18/02* (2006.01)
*H02K 11/33* (2016.01)

(52) U.S. Cl.
CPC ......... *F04C 18/0215* (2013.01); *H02K 1/185* (2013.01); *H02K 11/33* (2016.01); *F04C 2240/30* (2013.01); *F04C 2240/403* (2013.01)

(58) Field of Classification Search
CPC .... F04C 18/0215; F04C 23/008; F04C 23/02; F04C 27/008; F04C 29/00; F04C 29/0085; F04C 2240/30; F04C 2240/40; F04C 2240/403; H02K 1/185; H02K 11/33; H02K 7/14
See application file for complete search history.

(56) References Cited

U.S. PATENT DOCUMENTS 4,927,339 A 5/1990 Riffe et al.
5,170,555 A * 12/1992 Brown .................. H02K 1/185 29/888.025
2006/0159579 A1* 7/2006 Skinner ................ F04C 23/008 418/55.1
2013/0202464 A1* 8/2013 Miyaki .................. F01C 21/10 417/410.4

(Continued)

FOREIGN PATENT DOCUMENTS

JP S63-235683 A 9/1988
JP 2-153282 A 6/1990

(Continued)

OTHER PUBLICATIONS

Communication dated Feb. 3, 2026 in Japanese Application No. 2023-048902.

(Continued)

*Primary Examiner* — Dapinder Singh
(74) *Attorney, Agent, or Firm* — Sughrue Mion, PLLC

(57) ABSTRACT

An electric compressor includes a housing, a driving shaft, an electric motor, and a compression mechanism. The housing includes a first housing and a second housing. The electric motor includes a stator and a rotor. The first housing has a first end surface. The second housing has a second end surface. The first housing and the second housing are fixed by a first fastener. The stator is fixed to the first end surface by a second fastener. The first end surface has a first hole through which the first fastener is inserted and a second hole in which the second fastener is fixed.

6 Claims, 7 Drawing Sheets

(56) References Cited

U.S. PATENT DOCUMENTS

2016/0065027 A1* 3/2016 Taniguchi .............. H02K 7/083
310/91

FOREIGN PATENT DOCUMENTS

| | | | |
|---|---|---|---|
| JP | 2000-97168 | A | 4/2000 |
| JP | 2005-291004 | A | 10/2005 |
| JP | 2007-49842 | A | 2/2007 |
| JP | 2019-180217 | A | 10/2019 |
| WO | 2020/130009 | A1 | 6/2020 |

OTHER PUBLICATIONS

Communication mailed Jun. 16, 2026 in Japanese Application No. 2023-048902.

* cited by examiner

FIG. 4

ELECTRIC COMPRESSOR

BACKGROUND ART

This application claims priority to Japanese Patent Application No. 2023-048902 filed on Mar. 24, 2023, the entire disclosure of which is incorporated herein by reference.

The present disclosure relates to an electric compressor.

Japanese Patent Application Publication No. 2000-097168 discloses a conventional electric compressor. This electric compressor includes a housing, a compression mechanism, an electric motor, and a driving shaft. The housing includes a first housing and a second housing. The first housing and the second housing extend in an axial direction of the electric compressor. The first housing has a first end surface facing the second housing in the axial direction. A first hole and a second hole are formed in the first end surface. On the other hand, the second housing has a second end surface facing the first end surface in the axial direction. A through hole is also formed in the second housing. The through hole extends through the second housing in the axial direction.

The first housing and the second housing are fixed with each other in the axial direction of the electric compressor by a first fastener. Here, the first fastener is fixed in the first hole. In this way, a motor chamber is formed between the first housing and the second housing within the housing. The motor chamber communicates with an outside of the housing through the through hole. In other words, the motor chamber is not a space sealed against the outside of the housing.

The compression mechanism is specifically a scroll type compression mechanism, and includes a fixed scroll and an orbiting scroll. The fixed scroll is fixed to the first housing and located opposite to the second housing across the first housing in the axial direction of the electric compressor. The orbiting scroll is disposed in the first housing. The orbiting scroll faces the fixed scroll in the axial direction and is engaged with the fixed scroll.

The electric motor is disposed in the motor chamber. The electric motor includes a stator that is formed in a cylindrical shape and a rotor that is rotatable inside the stator. The stator is fixed to the first end surface of the first housing by a second fastener. Here, the second fastener is fixed in the second hole.

The driving shaft is fixed to the rotor. The driving shaft is rotatably supported by the first housing and the second housing in the motor chamber. A bush is also attached to the driving shaft. The driving shaft is connected to the orbiting scroll through a bush. With this configuration, the electric motor drives the orbiting scroll through the driving shaft.

In this electric compressor, the bush is attached to the driving shaft with the driving shaft and the electric motor disposed in the motor chamber. Here, in this electric compressor, it is possible to hold the driving shaft in the motor chamber with a tool, which is inserted into the second housing from the outside of the housing through an insertion hole formed in the second housing. Thus, the bush is easily attached to the driving shaft in this electric compressor.

In order to fix the stator to the first housing by the second fastener in this type of electric compressor, a fixing portion that is in contact with the stator and to which the second fastener is fixed together with the stator need be formed in the first housing. Here, when the fixing portion is formed in the first housing so as to protrude from the first housing to the stator in a radial direction of the first housing, a stress when the stator is fixed to the fixing portion is easily concentrated on the fixing portion, which causes a concern about durability of the fixing portion. In a case where such a fixing portion is used, the fixing portion need be increased in size to ensure enough stiffness for tolerating the stress. This causes the first housing, and by extension, the housing, to be increased in size, which is problematic.

Also, in this type of electric compressor, the first housing and the second housing cooperate to form a suction chamber into which refrigerant is sucked, and an electric motor is disposed in this suction chamber. In this regard, in the conventional electric compressor described above, the motor chamber communicates with the outside of the housing through the through hole formed in the second housing. With this configuration, the motor chamber is unusable as the suction chamber in this electric compressor. Accordingly, it is required to prevent the refrigerant in the suction chamber from leaking to the outside of the suction chamber while the stator is fixed to the first housing as described above.

The present disclosure has been made in view of the above conventional circumstances, and is directed to providing an electric compressor in which a stator is fixed to a first housing, a housing is decreased in size, and refrigerant is prevented from leaking from a suction chamber to the outside the housing.

SUMMARY

In accordance with an aspect of the present disclosure, there is provided an electric compressor that includes a housing, a driving shaft, an electric motor that rotates the driving shaft, and a compression mechanism that is driven with rotation of the driving shaft to compress refrigerant. The housing includes a first housing extending in an axial direction of the driving shaft and a second housing fixed to the first housing in the axial direction. The electric motor includes a stator formed in a cylindrical shape and a rotor that is rotatable inside the stator. The first housing and the second housing cooperate to form a suction chamber that is divided from an outside of the housing and into which the refrigerant is sucked. The first housing has a first end surface facing the second housing in the axial direction. The second housing has a second end surface facing the first end surface in the axial direction. A sealing member is provided between the first end surface and the second end surface and seals the suction chamber against the outside of the housing. The first housing and the second housing are fixed with each other by a first fastener. The stator is disposed in the suction chamber and fixed to the first end surface by a second fastener in the axial direction. The first end surface has a first hole which the first fastener is inserted through or fixed in and a second hole in which the second fastener is fixed.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 4 is a cross-sectional view of an electric compressor according to a second embodiment;

DETAILED DESCRIPTION OF THE EMBODIMENTS

The following will describe a first embodiment and a second embodiment according to the present disclosure with reference to the drawings. Electric compressors (hereinafter, simply called compressors) in the first embodiment and the second embodiment are specifically scroll type electric compressors. These compressors are each mounted on a vehicle, which is not illustrated, and serve as a part of a vehicle air conditioner. The vehicle is an example of a "mounting object" in the present disclosure.

First Embodiment

Figure 1:
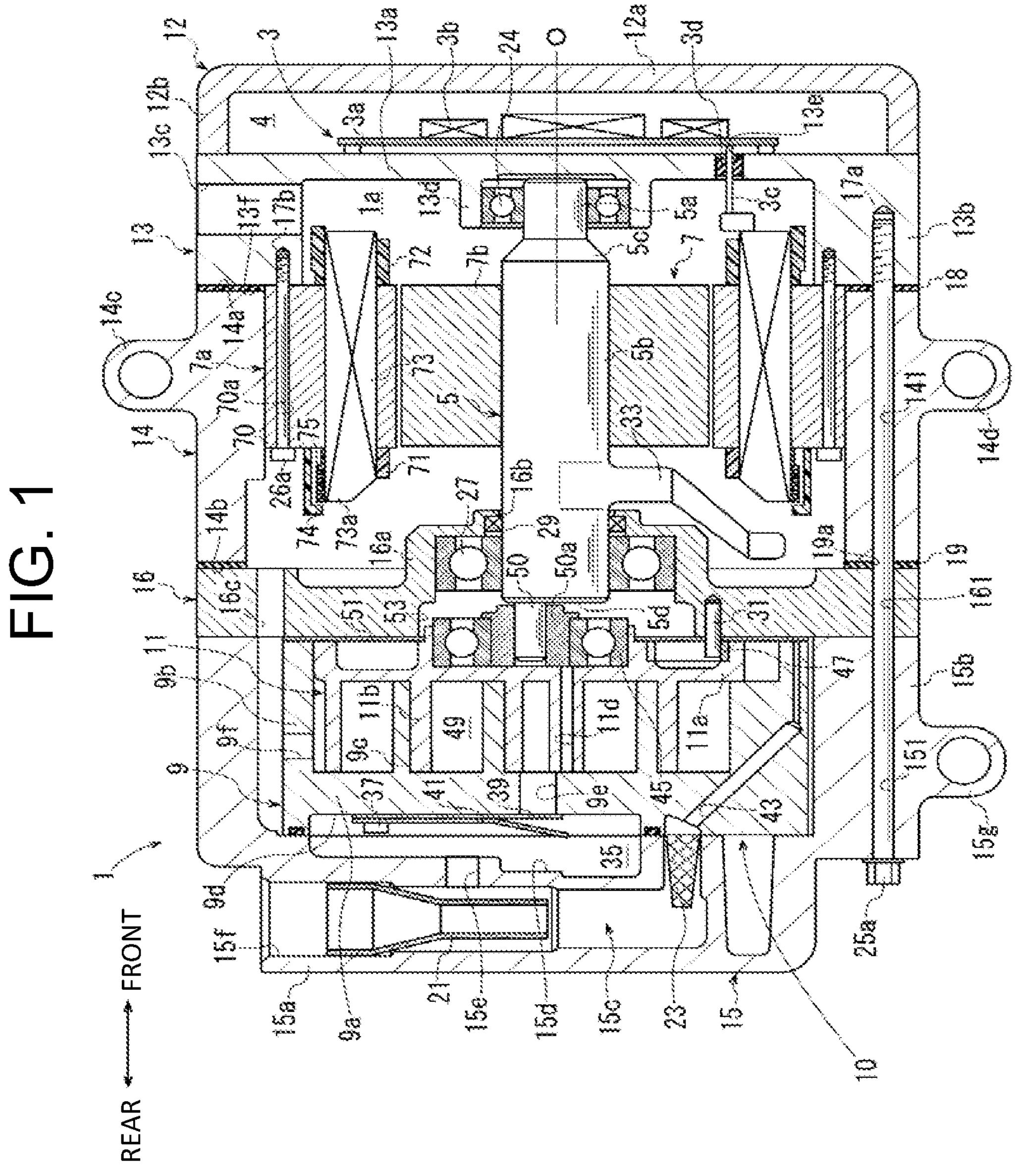
FIG. 1 is a cross-sectional view of an electric compressor according to a first embodiment.

As illustrated in FIG. 1, the compressor in the first embodiment includes a housing 1, an inverter 3, a driving shaft 5, an electric motor 7, and a compression mechanism 10.

Figure 2:
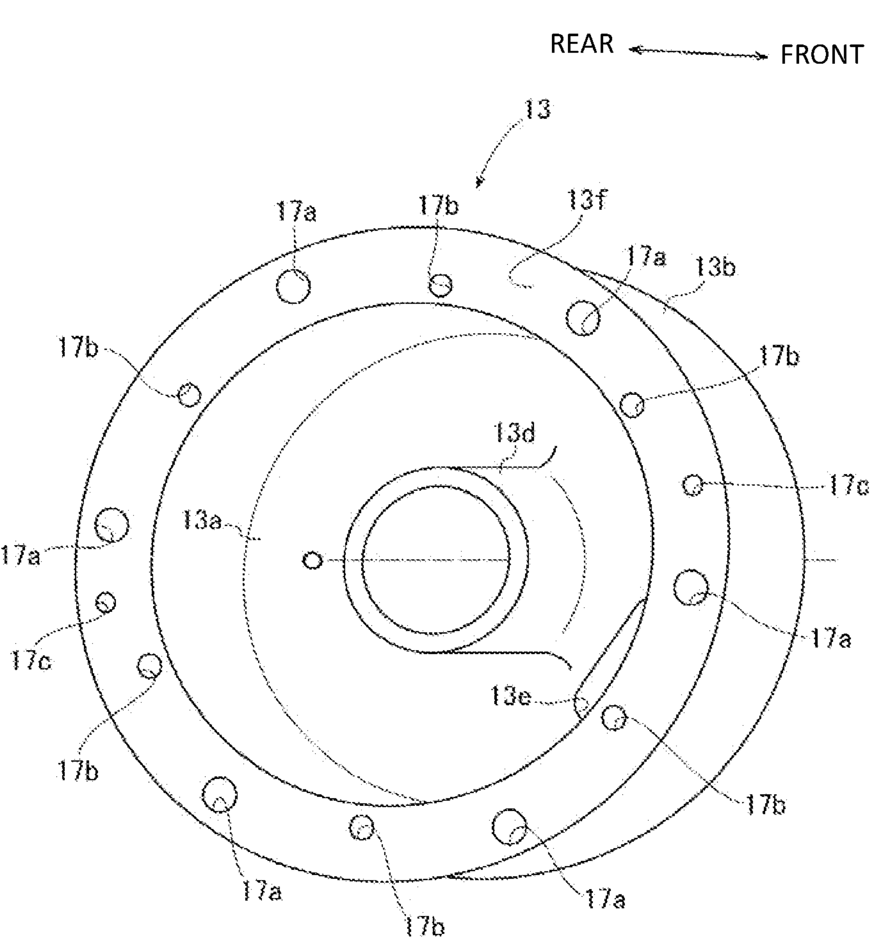
FIG. 2 is a perspective view of a first housing in the electric compressor according to the first embodiment.

In the present embodiment, a front and rear direction of the compressor is defined by a two-headed solid arrow illustrated in FIG. 1. The front and rear direction is an example of an "axial direction" in the present disclosure. In FIG. 2 and the subsequent drawings, the front and rear direction of the compressor is defined in correspondence with FIG. 1. The front and rear direction is an example for ease of explanation, and a posture of the compressor is changed as appropriate in correspondence with a vehicle on which the compressor is mounted.

As illustrated in FIG. 1, the housing 1 is formed of a first housing 13, a second housing 14, a third housing 15, a fixed block 16, and an inverter housing 12.

As illustrated in FIGS. 1 and 2, the first housing 13 has a front wall 13*a* and a peripheral wall 13*b*. The front wall 13*a* is located at a front end of the first housing 13 and extends in a radial direction of the first housing 13. Note that a "radial direction" is a direction perpendicular to the front and rear direction of the compressor, that is, a direction perpendicular to the axial direction.

The peripheral wall 13*b* is formed in a cylindrical shape extending around a driving axis O as the center axis. The peripheral wall 13*b* is connected to the front wall 13*a* and extends rearward from the front wall 13*a*. The front wall 13*a* and the peripheral wall 13*b* form the first housing 13, which has a bottomed cylindrical shape that is open in a rear direction of the compressor. The driving axis O is parallel with the front and rear direction of the compressor.

The first housing 13 includes a suction connection port 13*c*, a supporting portion 13*d*, and a communication port 13*e*. As illustrated in FIG. 1, the suction connection port 13*c* is formed in the peripheral wall 13*b*. The suction connection port 13*c* extends through the peripheral wall 13*b* in the radial direction of the compressor. A pipe, which is not illustrated, is connected to the suction connection port 13*c*.

As illustrated in FIGS. 1 and 2, the supporting portion 13*d* and the communication port 13*e* are formed in the front wall 13*a*. The supporting portion 13*d* is formed in a cylindrical shape extending around the driving axis O as the center axis and protrudes rearward from the front wall 13*a*. As illustrated in FIG. 1, a first radial bearing 24 is provided inside the supporting portion 13*d*. The communication port 13*e* is located on an outer side of the supporting portion 13*d* in the radial direction of the compressor, and extends through the front wall 13*a* in the front and rear direction. Note that an illustration of the first radial bearing 24 is omitted for ease of explanation in FIG. 2.

The first housing 13 also has a first end surface 13*f*. The first end surface 13*f* is a rear end surface of the peripheral wall 13*b*. Accordingly, the first end surface 13*f* is located at a rear end of the first housing 13.

As illustrated in FIG. 2, six first fixing holes 17*a*, six second fixing holes 17*b*, and two positioning holes 17*c* are formed in the first end surface 13*f*. Each of the first fixing holes 17*a* is an example of a "first hole" in the present disclosure. Each of the second fixing holes 17*b* is an example of a "second hole" in the present disclosure.

The first fixing holes 17*a* are arranged at regular intervals in a circumferential direction of the first housing 13, are open in the first end surface 13*f*, and extend into the peripheral wall 13*b*. The second fixing holes 17*b* are arranged at regular intervals in the circumferential direction of the first housing 13, are open in the first end surface 13*f*, and extend into the peripheral wall 13*b*. The second fixing holes 17*b* are located on an inner side of the first fixing holes 17*a* in the radial direction of the compressor. A diameter of each of the second fixing holes 17*b* is smaller than that of each of the first fixing holes 17*a*. The number and the size of the first fixing holes 17*a* and the number and the size of the second fixing holes 17*b* may be designed as appropriate.

Housing fixing bolts 25*a* illustrated in FIG. 1 are fixed in the first fixing holes 17*a*. On the other hand, stator fixing bolts 26*a* are fixed in the respective second fixing holes 17*b*. That is, thread grooves, which are not illustrated, are formed in the first fixing holes 17*a*, and the housing fixing bolts 25*a* are screwed into the first fixing holes 17*a* to be engaged with the thread grooves. Thread grooves, which are not illustrated, are also formed in the second fixing holes 17*b*, and the stator fixing bolts 26*a* are screwed into the second fixing holes 17*b* to be engaged with the thread grooves. Each of the housing fixing bolts 25*a* is an example of a "first fastener" in the present disclosure, and each of the stator fixing bolts 26*a* is an example of a "second fastener" in the present disclosure.

The positioning holes 17*c* are arranged at regular intervals in the circumferential direction of the first housing 13, are open in the first end surface 13*f*, and extend into the peripheral wall 13*b*. Positioning pins, which are not illustrated, are inserted into the respective positioning holes 17*c*, and position the first housing 13 relative to the second housing 14. The arrangement and the size of the positioning holes 17*c* may be designed as appropriate. Instead of forming the positioning holes 17*c*, a plurality of positioning pins that protrude rearward from the first end surface 13*f* may be formed.

The first fixing holes 17*a*, the second fixing holes 17*b*, and the positioning holes 17*c* are each shifted in the circumferential direction of the first housing 13 in the first end surface 13*f*. The first end surface 13*f* is formed flat except for portions where the first fixing holes 17*a*, the second fixing holes 17*b*, and the positioning holes 17*c* are formed.

As illustrated in FIG. 1, the second housing 14 is disposed at a rear of the first housing 13. The second housing 14 has a cylindrical shape extending in the front and rear direction of the compressor around the driving axis O as the center axis. A peripheral wall of the second housing 14 is thinner than the peripheral wall 13*b* of the first housing 13.

The second housing 14 has a second end surface 14*a* and a third end surface 14*b*. The second end surface 14*a* is located at a front end of the second housing 14. On the other hand, the third end surface 14*b* is located at a rear end of the second housing 14.

Six bolt insertion holes 141 are formed in the second housing 14. Although detailed illustrations are omitted, the bolt insertion holes 141 are arranged at regular intervals in a circumferential direction of the second housing 14 so as to correspond to the respective first fixing holes 17*a*. The bolt insertion holes 141 extend through the second housing 14 in the front and rear direction of the compressor. Accordingly, the bolt insertion holes 141 on a front side thereof are open in the second end surface 14*a*, and the bolt insertion holes 141 on a rear side thereof are open in the third end surface 14*b*. The housing fixing bolts 25*a* are inserted through the respective bolt insertion holes 141. That is, unlike the first fixing holes 17*a*, the housing fixing bolts 25*a* are not fixed in the bolt insertion holes 141. Although not illustrated, two positioning pins that protrude forward are fixed to the second end surface 14*a*. Note that one of the bolt insertion holes 141 is illustrated in FIG. 1. The same goes for bolt insertion holes 151, 161 described later.

The second housing 14 also has an attachment leg 14*c* and an attachment leg 14*d*. The attachment legs 14*c*, 14*d* protrude from an outer peripheral surface of the second housing 14 toward an outside of the second housing 14 in a radial direction of the second housing 14.

Here, the attachment legs 14*c*, 14*d* are disposed between the second end surface 14*a* and the third end surface 14*b* in the front and rear direction of the compressor. In other words, the attachment legs 14*c*, 14*d* are disposed away from the second end surface 14*a* in the rear direction of the compressor and away from the third end surface 14*b* in the front direction of the compressor. Note that the second housing 14 may have either the attachment leg 14*c* or the attachment leg 14*d* or may have another attachment leg in addition to the attachment legs 14*c*, 14*d*.

The third housing 15 has a rear wall 15*a*, a peripheral wall 15*b*, and an attachment leg 15*g*. The rear wall 15*a* is located at a rear end of the third housing 15, and extends in a radial direction of the third housing 15. The peripheral wall 15*b* is connected to the rear wall 15*a* and extends forward from the rear wall 15*a*. The rear wall 15*a* and the peripheral wall 15*b* form the third housing 15, which has a bottomed cylindrical shape that is open in the front direction of the compressor.

The attachment leg 15*g* protrudes from an outer peripheral surface of the peripheral wall 15*b* toward an outside of the third housing 15 in the radial direction of the third housing 15. Note that the attachment leg 15*g* may be omitted in the third housing 15.

An oil separation chamber 15*c*, a first discharge recess 15*d*, a discharge passage 15*e*, and a discharge connection port 15*f* are formed in the third housing 15. The oil separation chamber 15*c* is located on a rear side of the third housing 15 therein and extends in the radial direction of the third housing 15. The first discharge recess 15*d* is located in front of the oil separation chamber 15*c* in the third housing 15, and recessed toward the oil separation chamber 15*c*. The discharge passage 15*e* extends in the front and rear direction of the compressor, and the oil separation chamber 15*c* communicates with the first discharge recess 15*d* through the discharge passage 15*e*. The discharge connection port 15*f* communicates with an upper end of the oil separation chamber 15*c* and opens toward the outside of the third housing 15. The discharge connection port 15*f* is connected to a pipe, which is not illustrated.

An oil separation cylinder 21 is fixed in the oil separation chamber 15*c*. An inner peripheral surface of the oil separation chamber 15*c* and an outer peripheral surface of the oil separation cylinder 21 cooperate to form a separator. A filter 23 is provided under the oil separation cylinder 21 in the oil separation chamber 15*c*.

The six bolt insertion holes 151 are formed in the peripheral wall 15*b*. Although detailed illustrations are omitted, the bolt insertion holes 151 are arranged at regular intervals in a circumferential direction of the third housing 15 so as to correspond to the respective bolt insertion holes 141 of the second housing 14. The bolt insertion holes 151 extend through the peripheral wall 15*b* in the front and rear direction of the compressor.

The fixed block 16 is disposed between the second housing 14 and the third housing 15. The fixed block 16 has a boss 16*a* protruding forward. An insertion hole 16*b* is formed at an end of the boss 16*a*. A second radial bearing 27 and a shaft sealing member 29 are provided inside the boss 16*a*.

In addition, a suction passage 16*c* and the six bolt insertion holes 161 are formed in the fixed block 16. The suction passage 16*c* is located on an outer side of the boss 16*a* in a radial direction of the fixed block 16. The suction passage 16*c* extends through the fixed block 16 in the front and rear direction of the compressor.

The bolt insertion holes 161 are also located on the outer side of the boss 16*a* in the radial direction of the fixed block 16. Although detailed illustrations are omitted, the bolt insertion holes 161 are arranged at regular intervals in a circumferential direction of the fixed block 16 so as to correspond to the respective bolt insertion holes 141 of the second housing 14 and the respective bolt insertion holes 151 of the third housing 15. The bolt insertion holes 161 extend through the fixed block 16 in the front and rear direction of the compressor.

In addition, a plurality of anti-rotation pins 31 that protrude rearward are fixed in the fixed block 16. Note that one of the plurality of anti-rotation pins 31 and one of a plurality of rings 47 described later are illustrated in FIG. 1. The same goes for FIG. 4.

As illustrated in FIG. 1, the inverter housing 12 is disposed at a front of the first housing 13. The inverter housing 12 has a front wall 12*a* and a peripheral wall 12*b*. The front wall 12*a* is located at a front end of the inverter housing 12 and extends in a radial direction of the inverter housing 12. The peripheral wall 12*b* has a cylindrical shape extending in the front and rear direction of the compressor around the driving axis O as the center axis. The peripheral wall 12*b* is connected to the front wall 12*a* and extends rearward from the front wall 12*a*. The front wall 12*a* and the peripheral wall 12*b* form the inverter housing 12, which has a bottomed cylindrical shape that is open in the rear direction of the compressor. The inverter housing 12 also has a connector, which is not illustrated.

The inverter housing 12 is fixed to the first housing 13 by bolts, which are not illustrated, with a rear end of the peripheral wall 12*b* of the inverter housing 12 being in contact with the front wall 13*a* of the first housing 13. Thus, the inverter housing 12 and the first housing 13 are fixed with each other in the front and rear direction of the compressor.

When the inverter housing 12 and the first housing 13 are fixed with each other, an inverter chamber 4 is formed inside the peripheral wall 12*b* of the inverter housing 12 and between the front wall 13*a* of the first housing 13 and the front wall 12*a* of the inverter housing 12.

In the housing 1, a gasket 18 is provided between the first end surface 13*f* of the first housing 13 and the second end surface 14*a* of the second housing 14. The gasket 18 is an example of a "sealing member" in the present disclosure. Although detailed illustrations are omitted, the gasket 18 is formed of a plate-shaped core material made of metal and resin layers provided on opposite sides of the core material. Thus, the gasket 18 is formed in a plate shape. Note that the gasket 18 may be formed of only a plate-shaped resin material, for example.

Figure 3:
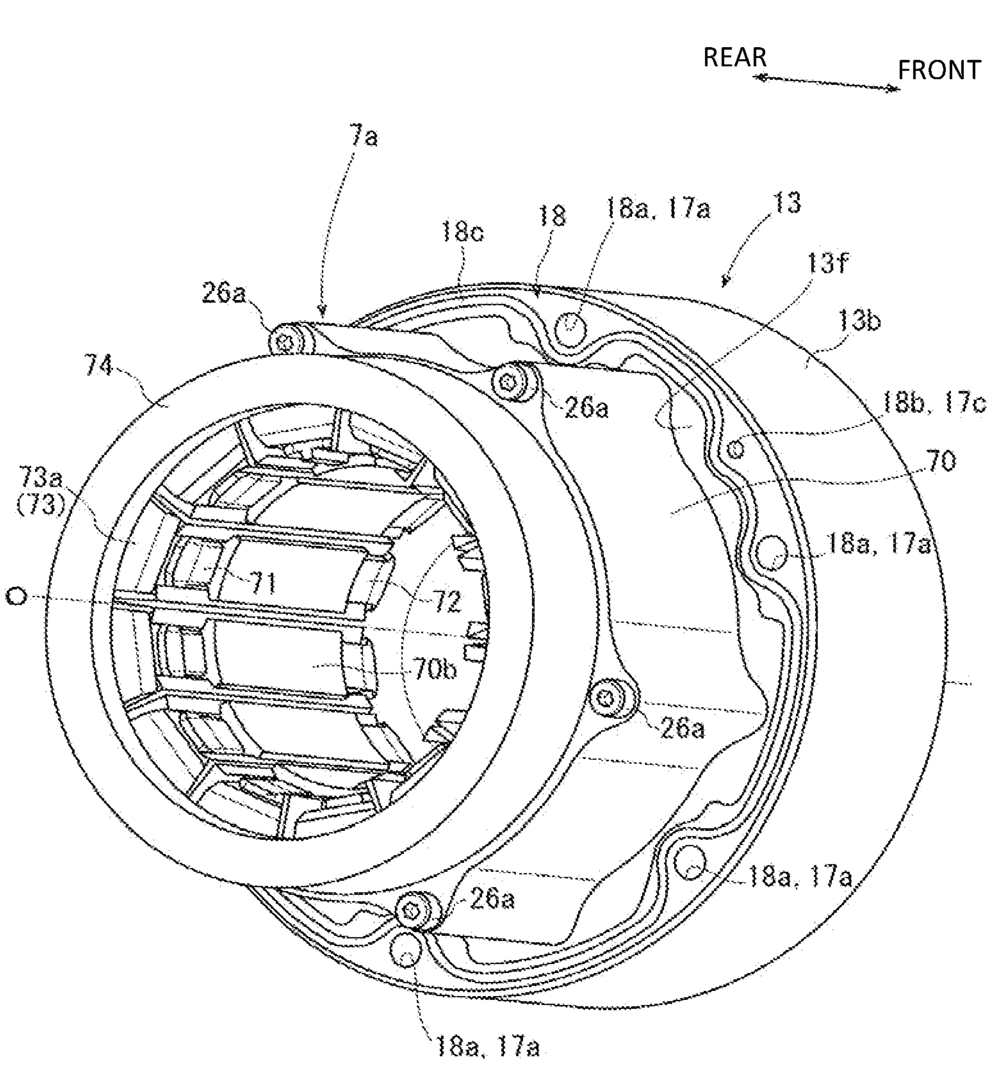
FIG. 3 is a perspective view illustrating a state in which a stator is fixed to a first end surface in the electric compressor according to the first embodiment.

As illustrated in FIG. 3, the gasket 18 is formed in a substantially annular shape. More specifically, the gasket 18 is formed such that the gasket 18 keeps away from the second fixing holes 17*b* and portions near the second fixing holes 17*b* in the first end surface 13*f* on an outer side thereof in the radial direction of the compressor when the gasket 18 is disposed between the first end surface 13*f* of the first housing 13 and the second end surface 14*a* of the second housing 14. That is, the gasket 18 is formed in the substantially annular shape enclosing the whole of the second fixing holes 17*b* in the radial direction of the first housing 13, while the gasket 18 is located on the outer side of the second fixing holes 17*b* formed in the first end surface 13*f* when the gasket 18 is disposed between the first end surface 13*f* of the first housing 13 and the second end surface 14*a* of the second housing 14. Thus, the gasket 18 is formed such that the gasket 18 does not overlap the second fixing holes 17*b* and the portions near the second fixing holes 17*b* in the first end surface 13*f* in the front and rear direction of the compressor.

Six first through holes 18*a*, two second through holes 18*b*, and ribs 18*c* are formed in the gasket 18. The first through holes 18*a* and the second through holes 18*b* extend through the gasket 18 in the front and rear direction of the compressor. The first through holes 18*a* are disposed at portions of the gasket 18 in correspondence with the first fixing holes 17*a* of the first housing 13. On the other hand, the second through holes 18*b* are disposed at portions of the gasket 18 in correspondence with the positioning holes 17*c* of the first housing 13.

The ribs 18*c* are formed on opposite sides of the gasket 18, and protrude in a front direction and a rear direction of the gasket 18, respectively. The ribs 18*c* are located inside the first through holes 18*a* and the second through holes 18*b* in the radial direction of the gasket 18, and make one round on the gasket 18 in a circumferential direction thereof.

As illustrated in FIG. 1, in the housing 1, a gasket 19 is provided between the third end surface 14*b* of the second housing 14 and the fixed block 16. Similarly to the gasket 18, the gasket 19 is formed in a plate shape. Six through holes 19*a* are formed in the gasket 19 in correspondence with the bolt insertion holes 141, 161. Although not illustrated, a gasket is also provided between the third housing 15 and the fixed block 16.

In the housing 1, the first, second, and third housings 13, 14, 15, the fixed block 16, and the gaskets 18, 19 are fixed by the six housing fixing bolts 25*a*. Here, when the first, second, and third housings 13, 14, 15, the fixed block 16, and the gaskets 18, 19 are fixed with each other, firstly, the first housing 13, the second housing 14, the fixed block 16, and the third housing 15 are arranged in this order from a front side of the compressor toward a rear side of the compressor. In addition, the gasket 18 is disposed between the first end surface 13*f* of the first housing 13 and the second end surface 14*a* of the second housing 14, and the gasket 19 is disposed between the third end surface 14*b* of the second housing 14 and the fixed block 16. At this time, the first through holes 18*a* and the second through holes 18*b* of the gasket 18 get aligned with the first fixing holes 17*a* and the positioning holes 17*c* of the first end surface 13*f*, respectively. Similarly, in the gasket 19, the through holes 19*a* get aligned with the bolt insertion holes 141 of the second end surface 14*a*.

Then, in the second housing 14, the positioning pins provided on the second end surface 14*a* are inserted into the positioning holes 17*c*. With this operation, the first housing 13 is positioned relative to the second housing 14, so that the first fixing holes 17*a*, the first through holes 18*a*, and the bolt insertion holes 141 get aligned with each other in the front and rear direction of the compressor. Similarly to the first housing 13 and the second housing 14, the third housing 15, the fixed block 16, and the second housing 14 are positioned relative to each other, so that the bolt insertion holes 151, the bolt insertion holes 161, the through holes 19*a*, and the bolt insertion holes 141 get aligned with each other in the front and rear direction of the compressor.

Then, in this state, the housing fixing bolts 25*a* are inserted into the bolt insertion holes 151 from the third housing 15 toward the first housing 13. Accordingly, the housing fixing bolts 25*a* are inserted into the bolt insertion holes 151, the bolt insertion holes 161, the through holes 19*a*, the bolt insertion holes 141, and the first through holes 18*a* in this order. Then, the housing fixing bolts 25*a* are fixed in the first fixing holes 17*a* by screwing the housing fixing bolts 25*a* into the first fixing holes 17*a* formed in the first end surface 13*f*. Thus, the first, second, and third housings 13, 14, 15, the fixed block 16, and the first and second gaskets 18, 19 are fixed with each other in the front and rear direction of the compressor. As described above, the inverter housing 12 is fixed to the first housing 13. That is, in the housing 1, the inverter housing 12, the first housing 13, the second housing 14, the fixed block 16, and the third housing 15 are fixed in this order from the front side of the compressor toward the rear side of the compressor.

In the housing 1, the first end surface 13*f* of the first housing 13 faces the second end surface 14*a* of the second housing 14 through the gasket 18 in the front and rear direction of the compressor. Similarly to the first housing 13 and the second housing 14, the third end surface 14*b* of the second housing 14 faces the fixed block 16 through the gasket 19 in the front and rear direction of the compressor and the front end of the peripheral wall 15*b* of the third housing 15 faces the fixed block 16 through the gasket in the front and rear direction of the compressor through the gasket.

In the housing 1, the first housing 13, the second housing 14, and the fixed block 16 cooperate to form a suction chamber 1*a*. The suction chamber 1*a* is defined by the first housing 13, the second housing 14, the fixed block 16, and the first and second gaskets 18, 19 and divided from the outside of the housing 1. Here, the gasket 18 seals the suction chamber 1*a* against the outside of the housing 1. The suction chamber 1*a* communicates with the suction connection port 13*c*. With this configuration, refrigerant is suctioned from the outside of the housing 1 into the suction chamber 1*a* through the pipe connected to the suction connection port 13*c*. The suction chamber 1*a* also communicates with the suction passage 16*c*.

The inverter 3 is accommodated in the inverter chamber 4. The inverter 3 is formed of a circuit board 3*a*, switching elements 3*b* mounted on the circuit board 3*a*, and the like. In the inverter 3, the circuit board 3*a* is fixed to the front wall 13*a* of the first housing 13 by bolts, which are not illustrated. The inverter 3 is electrically connected to a battery, which is not illustrated, for the vehicle through the connector provided in the inverter housing 12.

The driving shaft 5 is disposed in the suction chamber 1*a*. The driving shaft 5 is formed in a columnar shape extending in the front and rear direction of the compressor. The driving shaft 5 includes a small diameter portion 5*a*, a large diameter portion 5*b*, and a tapered portion 5*c*. The small diameter portion 5*a* is located on a front side of the driving shaft 5. The large diameter portion 5*b* is located behind the small diameter portion 5*a*. A diameter of the large diameter portion 5*b* is larger than that of the small diameter portion 5*a*. A rear end surface 5*d* being flat is located at a rear end of the large diameter portion 5*b*. The tapered portion 5*c* is located between the small diameter portion 5*a* and the large diameter portion 5*b*. A front end of the tapered portion 5*c* is connected to the small diameter portion 5*a*. The tapered portion 5*c* increases in diameter as the tapered portion 5*c* extends rearward, and a rear end of the tapered portion 5*c* is connected to the large diameter portion 5*b*.

The small diameter portion 5*a* of the driving shaft 5 is rotatably supported by the supporting portion 13*d* of the first housing 13 through the first radial bearing 24. A rear end portion of the large diameter portion 5*b* is inserted into the insertion hole 16*b* of the fixed block 16 and enters the boss 16*a*. In the boss 16*a*, the rear end portion of the large diameter portion 5*b* is rotatably supported by the second radial bearing 27. As a result, the driving shaft 5 is rotatable around the driving axis O in the housing 1. A space between the boss 16*a* and the driving shaft 5 is sealed by the shaft sealing member 29.

In the driving shaft 5, an eccentric pin 50 is fixed to the large diameter portion 5*b*. The eccentric pin 50 is disposed at a position eccentric to the driving axis O in the rear end surface 5*d*. The eccentric pin 50 is formed in a columnar shape with a diameter smaller than that of the driving shaft 5, and extends rearward from the rear end surface 5*d*. When the large diameter portion 5*b* of the driving shaft 5 is inserted into the insertion hole 16*b*, the eccentric pin 50 enters the boss 16*a*. The eccentric pin 50 is engaged with a bush 50*a* in the boss 16*a*.

A balance weight 33 is formed integrally with the large diameter portion 5*b* of the driving shaft 5. The balance weight 33 is disposed at a position eccentric to the driving axis O in the large diameter portion 5*b*. More specifically, the balance weight 33 is disposed at a position distant from the eccentric pin 50 across the driving axis O.

Although detailed illustrations are omitted, the balance weight 33 is formed in a substantially fan-shaped plate shape. The balance weight 33 extends in a radial direction of the driving shaft 5 from the large diameter portion 5*b* toward the second housing 14. When the driving shaft 5 is disposed in the housing 1, the balance weight 33 is located in the suction chamber 1*a*. More specifically, the balance weight 33 is located between the fixed block 16 and the electric motor 7 in the suction chamber 1*a*. Note that a shape of the balance weight 33 may be designed as appropriate.

The electric motor 7 is formed of a stator 7*a* and a rotor 7*b*. As illustrated in FIG. 3, the stator 7*a* includes a stator core 70, a first insulator 71, a second insulator 72, a plurality of coils 73, and a cover 74.

The stator core 70 is made of metal. As illustrated in FIG. 1, the stator core 70 is formed in a substantially cylindrical shape extending in the front and rear direction of the compressor around the driving axis O as the center axis. Six insertion holes 70*a* are formed in the stator core 70. The insertion holes 70*a* are arranged at regular intervals in a circumferential direction of the stator core 70 so as to correspond to the respective second fixing holes 17*b* formed in the first end surface 13*f* of the first housing 13. The insertion holes 70*a* extend through the stator core 70 in the front and rear direction of the compressor. Here, as illustrated in FIG. 3, portions in the stator core 70 where the insertion holes 70*a* are formed protrude more outwardly in a radial direction of the stator core 70 than the other portions in the stator core 70. That is, the insertion holes 70*a* are located on an outer side of the cover 74 in the radial direction of the stator core 70. In the stator core 70, teeth 70*b* are formed on an inner side of the insertion holes 70*a* in the radial direction of the stator core 70.

The first insulator 71 and the second insulator 72 are made of resin such as PPS (polyphenylene sulfide), and have an electrical insulation property and heat resistance against heat generated from the coils 73. As illustrated in FIG. 1, the first insulator 71 is disposed away from the second insulator 72 in the front and rear direction of the compressor with the stator core 70 interposed between the first insulator 71 and the second insulator 72. That is, the first insulator 71 is disposed at a rear end of the stator core 70, and the second insulator 72 is disposed at a front end of the stator core 70. Although not illustrated, a plurality of first slots are formed in the first insulator 71, and a plurality of second slots are formed in the second insulator 72. In addition, guide portions 71*a* that guide conductor wires 75 are formed in the first insulator 71 (see FIG. 6). The first and second insulators 71, 72 may be made of other materials having an electrical insulation property and heat resistance.

The coils 73 are made of the conductor wires 75 wound around first slots of the first insulator 71, the teeth 70*b* of the stator core 70, and second slots of the second insulator 72. Each of the coils 73 has coil ends 73*a*. The coil ends 73*a* are specifically portions that protrude from the stator core 70 in the front and rear direction of the compressor in each of the coils 73. Here, inner peripheral portions of the coil ends 73*a* on a rear side thereof are inclined to avoid interference with the balance weight 33.

Similarly to the first and second insulators 71, 72, the cover 74 is made of resin, and has the electrical insulation property and the heat resistance. As illustrated in FIG. 3, the cover 74 is formed in a substantially cylindrical shape. The cover 74 is attached to the rear end of the stator core 70, and covers rear ends of the first insulator 71 and the coil ends 73*a* on the rear side thereof in the radial direction of the compressor.

As illustrated in FIG. 1, the rotor 7*b* is rotatably disposed inside the stator 7*a*. The large diameter portion 5*b* of the driving shaft 5 is fixed in the rotor 7*b* by shrink fitting. Thus, the rotor 7*b* and the driving shaft 5 are integrally formed with each other. The rotor 7*b* rotates inside the stator 7*a* to rotate the driving shaft 5 around the driving axis O.

As illustrated in FIGS. 1 and 3, in this compressor, the stator core 70, and by extension, the stator 7*a*, is fixed to the first end surface 13*f* of the first housing 13. When the stator core 70 is fixed to the first end surface 13*f*, the second fixing holes 17*b* in the first end surface 13*f* and the insertion holes 70*a* of the stator core 70 get aligned with each other in the front and rear direction of the compressor. In this state, the stator fixing bolts 26*a* are inserted into the respective insertion holes 70*a* from the rear end of the stator core 70 toward the first housing 13. Then, the stator fixing bolts 26*a* are fixed in the second fixing holes 17*b* by screwing the stator fixing bolts 26*a* into the second fixing holes 17*b*. Accordingly, the stator core 70 is fixed to the first end surface 13*f*. Here, as described above, the insertion holes 70*a* of the stator core 70 are located on the outer side of the cover 74 in the radial direction of the compressor in the stator core 70, and thus, the stator core 70 is fixed to the first end surface 13*f* by the stator fixing bolts 26*a* at a position on the outer side of the cover 74 in the radial direction of the compressor. Thus, in this compressor, the stator 7*a* and the rotor 7*b*, that is, the electric motor 7, is disposed in the suction chamber 1*a*. This means that in this compressor, the suction chamber 1*a* also serves as a motor chamber that accommodates the electric motor 7.

As illustrated in FIG. 2, in the first end surface 13*f*, the second fixing holes 17*b* are disposed on the inner side of the first fixing holes 17*a* in the radial direction of the first housing 13. Accordingly, the stator core 70 is fixed to the first end surface 13*f*, and by extension, to the first housing 13, by the stator fixing bolts 26*a* on an inner side of the housing fixing bolts 25*a* in the radial direction of the first housing 13.

As described above, the gasket 18 is formed such that the gasket 18 keeps away from the second fixing holes 17*b* and the portions near the second fixing holes 17*b* in the first end surface 13*f* on the outer side thereof in the radial direction of the compressor. Accordingly, the stator core 70 is fixed to first end surface 13*f* by the stator fixing bolts 26*a* with the front end of the stator core 70 being directly in contact with the first end surface 13*f*.

As illustrated in FIG. 1, each of the coils 73 of the stator 7*a* is connected to a connection terminal 3*c* in the suction chamber 1*a*. The connection terminal 3*c* is connected to the inverter 3 in the inverter chamber 4 while being inserted through the communication port 13*e*. Here, a space between the communication port 13*e* and the connection terminal 3*c* is sealed by a hermetically sealing member 3*d*. Thus, the stator 7*a* and the inverter 3 are electrically connected.

The compression mechanism 10 is specifically a scroll type compression mechanism, and includes a fixed scroll 9 and a movable scroll 11. The fixed scroll 9 is fixed to the third housing 15 and disposed in the third housing 15. The fixed scroll 9 has a fixed scroll base plate 9*a*, a fixed scroll peripheral wall 9*b*, and a fixed scroll spiral wall 9*c*. The fixed scroll base plate 9*a* is located at a rear end of the fixed scroll 9 and formed in a disc shape. A second discharge recess 9*d* and a discharge port 9*e* are formed in the fixed scroll base plate 9*a*. The second discharge recess 9*d* is recessed from a rear end surface of the fixed scroll base plate 9*a* in the front direction of the compressor. When the fixed scroll 9 is fixed to the third housing 15, the second discharge recess 9*d* faces the first discharge recess 15*d*. Thus, the first discharge recess 15*d* and the second discharge recess 9*d* cooperate to form a discharge chamber 35. The discharge chamber 35 communicates with the oil separation chamber 15*c* through the discharge passage 15*e*. The discharge port 9*e* extends through the fixed scroll base plate 9*a* in the front and rear direction of the compressor, and communicates with the discharge chamber 35.

A discharge reed valve 39 and a retainer 41 are attached to the fixed scroll base plate 9*a* by a fixing bolt 37. The fixing bolt 37, the discharge reed valve 39, and the retainer 41 are disposed in the discharge chamber 35. The discharge reed valve 39 is elastically deformed to open and close the discharge port 9*e*. The retainer 41 adjusts an amount of the elastic deformation of the discharge reed valve 39.

The fixed scroll peripheral wall 9*b* is connected to the fixed scroll base plate 9*a* at an outer periphery of the fixed scroll base plate 9*a*, and is formed in a cylindrical shape extending forward. A suction port 9*f* is formed in the fixed scroll peripheral wall 9*b*. The suction port 9*f* extends through the fixed scroll peripheral wall 9*b* in a radial direction of the fixed scroll 9. Accordingly, the suction port 9*f* opens in the third housing 15. The fixed scroll spiral wall 9*c* is provided upright from a front surface of the fixed scroll base plate 9*a*, and is formed integrally with the fixed scroll peripheral wall 9*b* inside the fixed scroll peripheral wall 9*b*.

An oil supply passage 43 is also formed in the fixed scroll 9. The oil supply passage 43 extends through the fixed scroll base plate 9*a* and the fixed scroll peripheral wall 9*b*. With this configuration, the oil supply passage 43 at a rear end thereof opens in the rear end surface of the fixed scroll base plate 9*a*, and the oil supply passage 43 at a front end thereof opens in a front end surface of the fixed scroll peripheral wall 9*b*. The oil supply passage 43 communicates with the oil separation chamber 15*c* through the filter 23. Note that a shape of the oil supply passage 43 may be designed as appropriate.

The movable scroll 11 is disposed in the third housing 15 and located between the fixed scroll 9 and the fixed block 16. The movable scroll 11 has a movable scroll base plate 11*a* and a movable scroll spiral wall 11*b*. The movable scroll base plate 11*a* is located at a front end of the movable scroll 11 and formed in a disc shape. The bush 50*a* is rotatably supported by the movable scroll base plate 11*a* through a third radial bearing 45. Thus, the movable scroll 11 is connected to the driving shaft 5 at a position eccentric to the driving axis O through the bush 50*a* and the eccentric pin 50.

The same number of rings 47 as the anti-rotation pins 31 are provided in the movable scroll base plate 11*a*. End portions of the anti-rotation pins 31 are loosely fitted into the rings 47. The anti-rotation pins 31 and the rings 47 cooperate to form an anti-rotation mechanism.

The movable scroll spiral wall 11*b* is provided upright from a rear surface of the movable scroll base plate 11*a*, and extends toward the fixed scroll base plate 9*a*. An air supply hole 11*d* is opened at a rear end of the movable scroll spiral wall 11*b* and located near a center of the movable scroll spiral wall 11*b*. The air supply hole 11*d* extends through the movable scroll spiral wall 11*b* and also through the movable scroll base plate 11*a* in the front and rear direction of the compressor.

The fixed scroll 9 and the movable scroll 11 are engaged with each other. With this engagement, the fixed scroll base plate 9*a*, the fixed scroll spiral wall 9*c*, the movable scroll base plate 11*a*, and the movable scroll spiral wall 11*b* cooperate to form a compression chamber 49 between the fixed scroll 9 and the movable scroll 11. The compression chamber 49 changes its volume as the movable scroll 11 rotates. This change causes the compression chamber 49 to communicate with each of the suction port 9*f* and the discharge port 9*e*.

A thrust plate 51 is provided between the movable scroll 11 and the fixed block 16. The thrust plate 51 is made of a thin metal plate, and is in contact with the movable scroll 11 and the fixed block 16 on the opposite sides of the thrust plate 51. The thrust plate 51 urges the movable scroll 11 rearward, that is, toward the fixed scroll 9 by a restoring force generated during elastic deformation. The movable scroll base plate 11*a* and the thrust plate 51 cooperate to form a back-pressure chamber 53 in the boss 16*a* of the fixed block 16. The back-pressure chamber 53 communicates with the air supply hole 11*d*.

The compressor configured as described above is attached to the vehicle when the attachment legs 14*c*, 14*d*, 15*g* are fixed to an engine or the like of the vehicle by bolts, which are not illustrated.

Then, in the compressor, the inverter 3 converts direct current supplied from the battery into alternating current by the switching elements 3*b*, so that power is supplied to the stator 7*a*. As a result, the electric motor 7 is driven and controlled by the inverter 3, thereby rotating the rotor 7*b* together with the driving shaft 5 in the stator 7*a*. Thus, in the compression mechanism 10, when the movable scroll 11 rotates, the movable scroll base plate 11*a* slides on a tip of the fixed scroll spiral wall 9*c*, and the fixed scroll spiral wall 9*c* and the movable scroll spiral wall 11*b* slide on each other. Here, rotation of the movable scroll 11 is regulated by the anti-rotation mechanism and the movable scroll 11 only rotates relative to the fixed scroll 9.

The refrigerant in the suction chamber 1*a* is sucked into the compression chamber 49 through the suction passage 16*c* and the suction port 9*f* with the rotation of the movable scroll 11. As a volume of the compression chamber 49 is reduced by the rotation of the movable scroll 11, the refrigerant in the compression chamber 49 is compressed. That is, the compression mechanism 10 is driven with the rotation of the driving shaft 5 to compress the refrigerant. The refrigerant with high pressure compressed in the compression chamber 49 is discharged to the discharge chamber 35 through the discharge port 9*e*, and then, flows from the discharge chamber 35 to the oil separation chamber 15*c* through the discharge passage 15*e*. Lubricant oil is separated from the refrigerant with the high pressure while the refrigerant goes back and force between the outer peripheral surface of the oil separation cylinder 21 and the inner peripheral surface of the oil separation chamber 15*c*. In this state, the refrigerant flows through the oil separation cylinder 21 and is discharged into the outside of the housing 1 through the discharge connection port 15*f*.

On the other hand, the lubricant oil separated from the refrigerant is stored in the oil separation chamber 15*c*. Then, this lubricant oil flows through the filter 23 and the oil supply passage 43 and is supplied to a sliding portion between the fixed scroll 9 and the movable scroll 11, an inside of the suction chamber 1*a*, or the like.

A part of the refrigerant with the high pressure compressed in the compression chamber 49 flows through the air supply hole 11*d* and is supplied to the back-pressure chamber 53. With this supply, the movable scroll 11 is urged toward the compression chamber 49 by pressure in the back-pressure chamber 53 via the thrust plate 51. The movable scroll 11 is also urged toward the compression chamber 49 by an elastic force of the thrust plate 51. Thus, in this compressor, the movable scroll 11 is prevented from rotating in a state where the movable scroll 11 is inclined relative to the driving axis O.

In this compressor, the stator 7*a* is fixed to the first end surface 13*f* by fixing the stator fixing bolts 26*a* in the second fixing holes 17*b* formed in the first end surface 13*f* of the first housing 13. Thus, in this compressor, the first end surface 13*f* serves as a seat surface for fixing the stator 7*a*, that is, as a fixing portion for the stator 7*a*. With this configuration, in this compressor, a fixing portion exclusively for the stator 7*a* need not be formed in the peripheral wall 13*b* of the first housing 13 such that the fixing portion partly protrudes into the suction chamber 1*a*.

That is, in a case where a fixing portion exclusively for the stator 7*a* is formed in the peripheral wall 13*b* such that the fixing portion partly protrudes into the suction chamber 1*a*, stress is easily concentrated at a connection portion between the peripheral wall 13*b* and the fixing portion when the stator 7*a* is fixed to such a fixing portion by the stator fixing bolts 26*a*. In this respect, in this compressor, the stator 7*a* is fixed to the first end surface 13*f* by the stator fixing bolts 26*a*, which suppresses the stress applied to the first end surface 13*f* when the stator 7*a* is fixed. Accordingly, in this compressor, it is not required to ensure an area of the first end surface 13*f* by forming the peripheral wall 13*b* excessively thick in order to ensure stiffness of the first end surface 13*f*. As a result, in this compressor, it is suppressed that the first housing 13 is increased in size.

In this compressor, the stator 7*a* is fixed to the first end surface 13*f*, and thus, a contact area between the first end surface 13*f* and the stator core 70 is suitably ensured. Here, in this compressor, the first end surface 13*f* is directly in contact with the stator core 70, and thus, the stator 7*a* is firmly fixed to the first end surface 13*f* by the stator fixing bolts 26*a*.

In this compressor, the first fixing holes 17*a* are formed in the first end surface 13*f*, and the housing fixing bolts 25*a* are fixed in the first fixing holes 17*a*. Accordingly, the first end surface 13*f* also serves as a fixing portion in which the first, second, and third housing 13, 14, 15 and the fixed block 16 are fixed by the housing fixing bolts 25*a*. This means that the fixing portion exclusively for fixing the housing fixing bolts 25*a* need not be formed in the first housing 13 in this compressor. Also in this respect, in this compressor, it is suppressed that the first housing 13 is increased in size.

In this compressor, the first housing 13, the second housing 14, and the fixed block 16 cooperate to form the suction chamber 1*a* in the housing 1. This suction chamber 1*a* is defined by the first housing 13, the second housing 14, the fixed block 16, and the first and second gaskets 18, 19 and divided from the outside of the housing 1. In other words, the suction chamber 1*a* is a space sealed against the outside of the housing 1. In addition, the gasket 18 is provided between the first end surface 13*f* and the second end surface 14*a*, and the gasket 19 is provided between the third end surface 14*b* and the fixed block 16. With this configuration, in this compressor, the refrigerant in the suction chamber 1*a* hardly leaks from a space between the first end surface 13*f* and the second end surface 14*a* and a space between the third end surface 14*b* and the fixed block 16 to the outside of the housing 1.

Therefore, according to the compressor of the first embodiment, the stator 7*a* is fixed to the first housing 13, the housing 1 is decreased in size, and the refrigerant is prevented from leaking from the suction chamber 1*a* to the outside of the housing 1.

In this compressor, the inverter housing 12 is fixed at the front of the first housing 13, and thus, the first, second, and third housing 13, 14, 15, the fixed block 16, and the inverter housing 12 are fixed in the front and rear direction of the compressor in the housing 1. With this configuration, in this compressor, it is suppressed that the housing 1, and by extension, the compressor, is increased in size in the radial direction of the compressor as compared to a case where the inverter housing 12 is fixed to the peripheral wall 13*b* of the first housing 13 or the second housing 14 in the radial direction of the compressor.

In the compressor, the stator core 70 of the stator 7*a* is fixed to the first end surface 13*f* by the stator fixing bolts 26*a* on the outer side of the cover 74, the first and second insulators 71, 72, and the coil ends 73*a* in the radial direction of the compressor. Accordingly, in this compressor, the stator core 70, and by extension, the stator 7*a*, is easily fixed to the first end surface 13*f* by the stator fixing bolts 26*a*.

Second Embodiment

Figure 4:
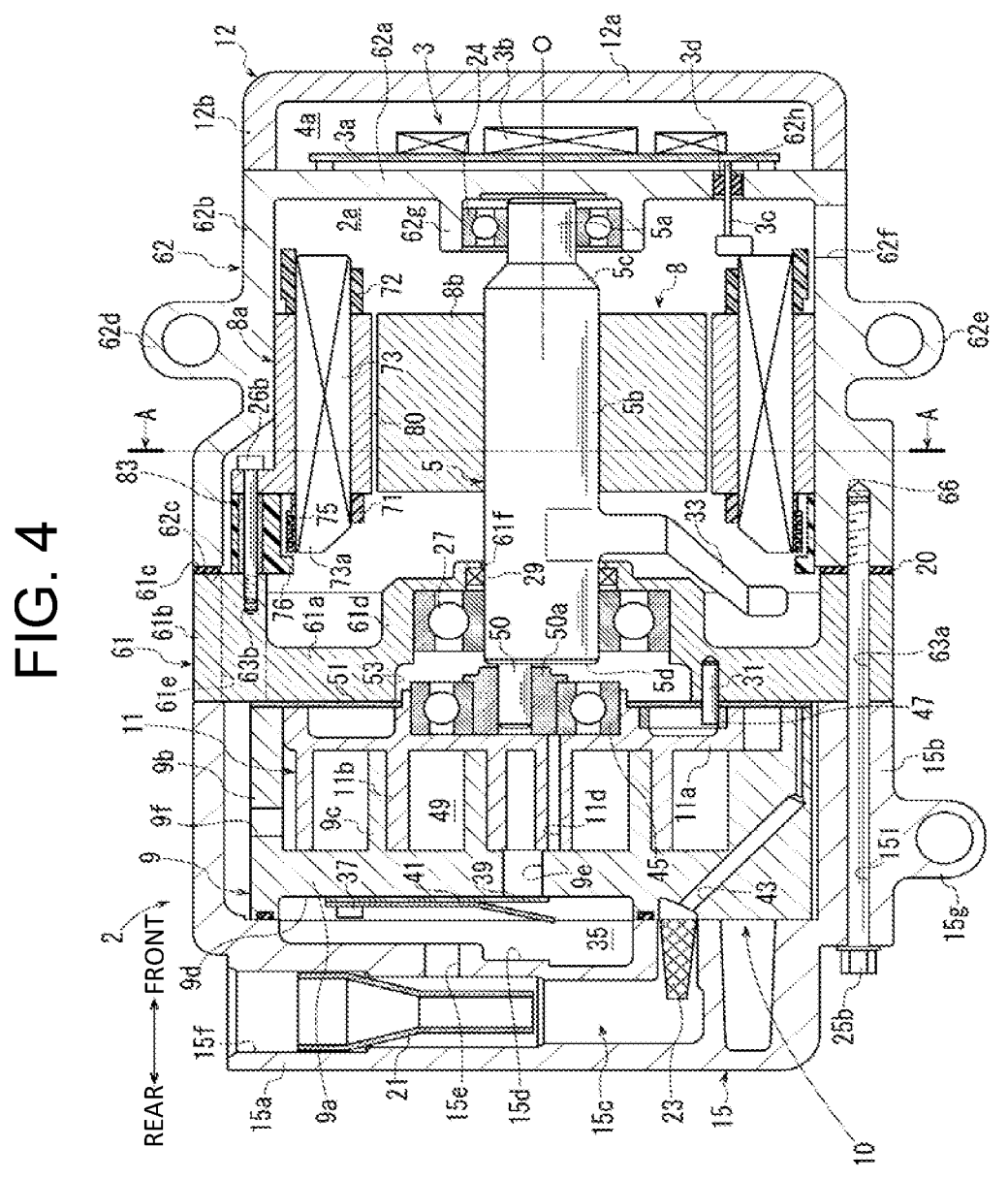

A compressor in a second embodiment includes a housing 2 and an electric motor 8, which are illustrated in FIG. 4, instead of the housing 1 and electric motor 7. The housing 2 is formed of a first housing 61, a second housing 62, the third housing 15, and the inverter housing 12.

The first housing 61 has a rear wall 61*a* and a peripheral wall 61*b*. The rear wall 61*a* is located at a rear end of the first housing 61, and extends in a radial direction of the first housing 61. Similarly to the fixed block 16 in the first embodiment, the plurality of anti-rotation pins 31 that protrude rearward are fixed to the rear wall 61*a*.

The peripheral wall 61*b* is formed in a cylindrical shape extending around the driving axis O as the center axis. The peripheral wall 61*b* is connected to the rear wall 61*a* and extends forward from the rear wall 61*a*. The rear wall 61*a* and the peripheral wall 61*b* form the first housing 61, which has a bottomed cylindrical shape that is open in the front direction of the compressor.

Figure 5:
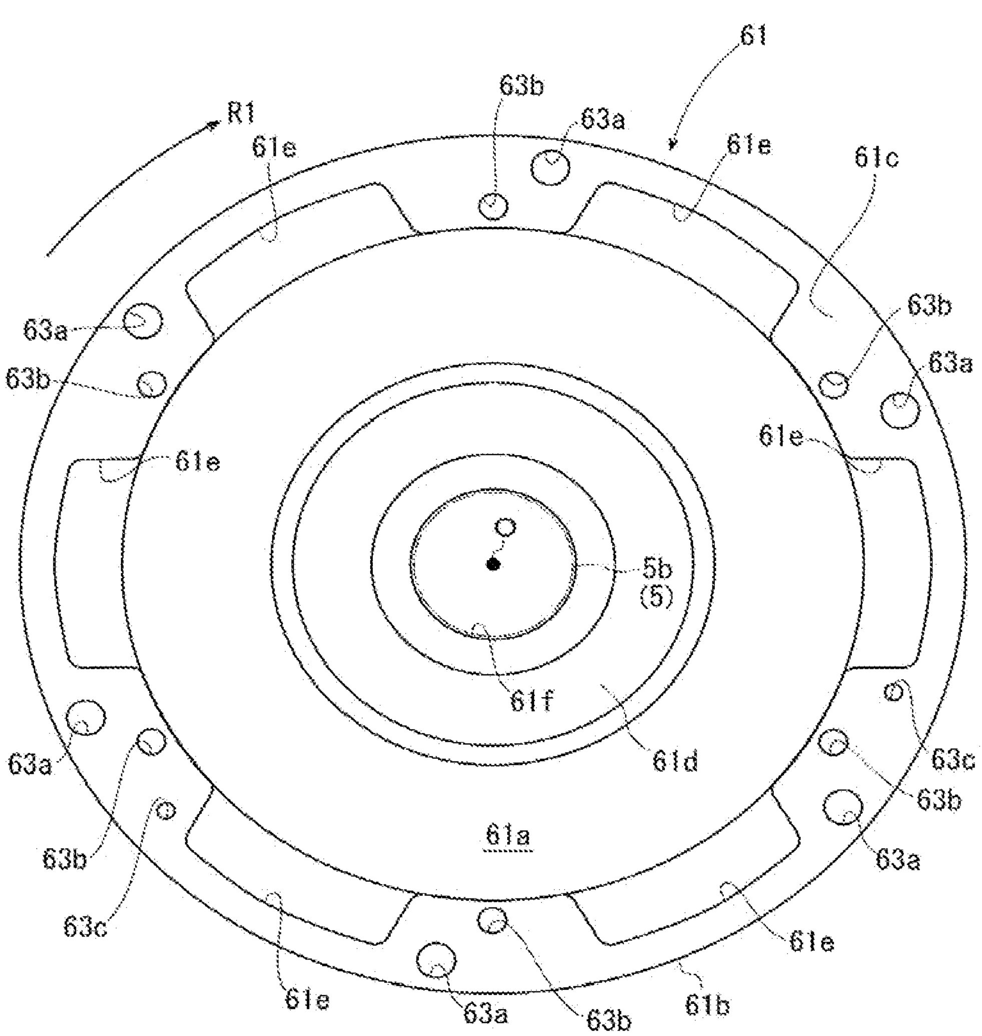
FIG. 5 is a front view of a first housing in the electric compressor according to the second embodiment.

As illustrated in FIG. 5, the first housing 61 has a first end surface 61*c*. The first end surface 61*c* is a front end surface of the peripheral wall 61*b*. That is, the first end surface 61*c* is located at a front end of the first housing 61.

Six bolt insertion holes 63*a*, six fixing holes 63*b*, and two positioning holes 63*c* are formed in the first end surface 61*c*. Each of the bolt insertion holes 63*a* is an example of the "first hole" in the present disclosure. Each of the fixing holes 63*b* is an example of the "second hole" in the present disclosure.

The bolt insertion holes 63*a* extend through the first housing 61 in the front and rear direction of the compressor. The bolt insertion holes 63*a* are arranged at regular intervals in a circumferential direction of the first housing 61. The housing fixing bolts 25*b* are inserted into the respective bolt insertion holes 63*a*. Each of the housing fixing bolts 25*b* is an example of the "first fastener" in the present disclosure.

The fixing holes 63*b* are arranged at regular intervals in the circumferential direction of the first housing 61, are open in the first end surface 61*c*, and extend into the peripheral wall 61*b*. The fixing holes 63*b* are located on an inner side of the bolt insertion holes 63*a* in the radial direction of the compressor. Thread grooves, which are not illustrated, are formed in the fixing holes 63*b*, and stator fixing bolts 26*b* are screwed into the fixing holes 63*b* to be engaged with the thread grooves. Each of the stator fixing bolts 26*b* is an example of the "second fastener" in the present embodiment. A diameter of each of the fixing holes 63*b* is smaller than that of each of the bolt insertion holes 63*a*. The number and the size of the bolt insertion holes 63*a* and the number and the size of the fixing holes 63*b* may be designed as appropriate.

Figure 8:
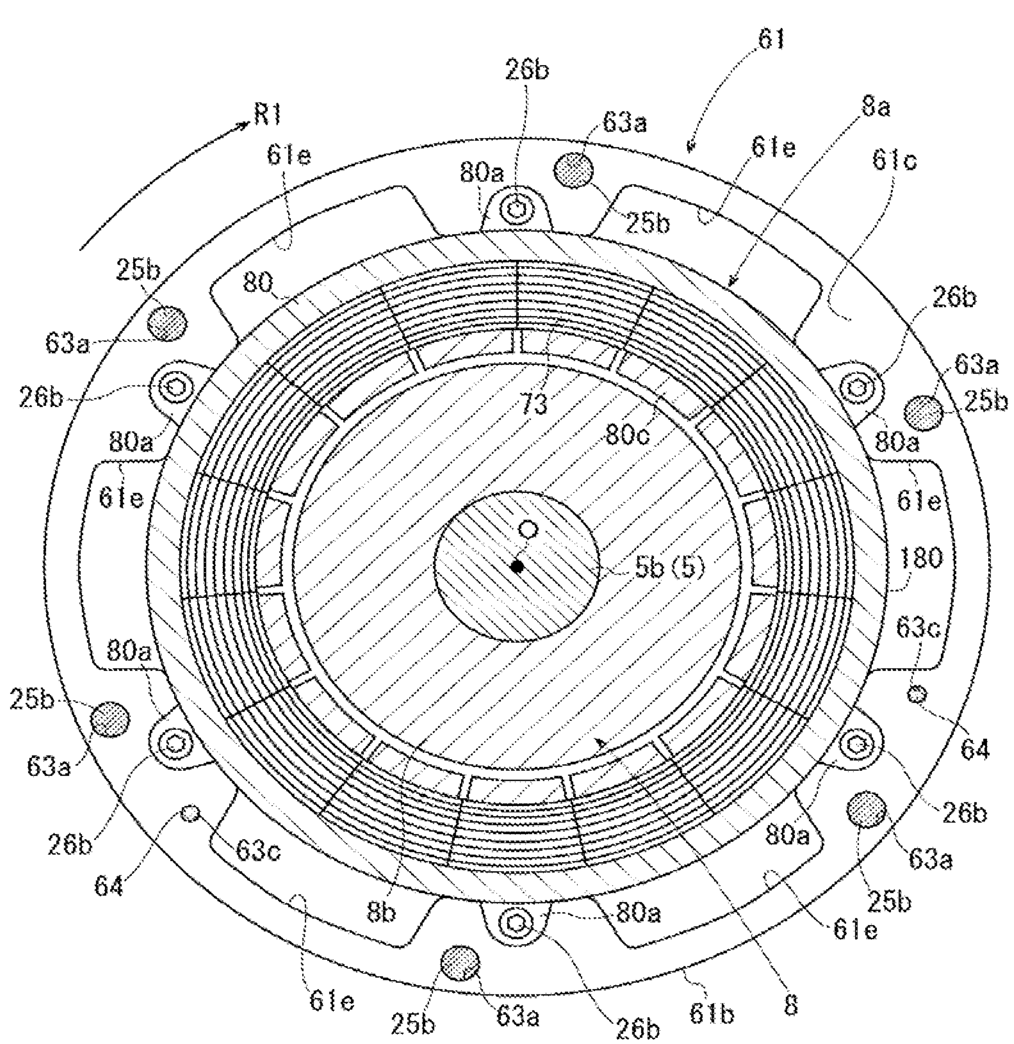
FIG. 8 is a cross-sectional view taken along a line A-A of FIG. 4 in the electric compressor according to the second embodiment.

The positioning holes 63*c* are arranged at regular intervals in the circumferential direction of the first housing 61, are open in the first end surface 61*c*, and extend into the peripheral wall 61*b*. Positioning pins 64 illustrated in FIG. 8 are inserted into the respective positioning holes 63*c*. Here, as illustrated in FIGS. 5 and 8, the bolt insertion holes 63*a*, the fixing holes 63*b*, and the positioning holes 63*c* are each shifted in the circumferential direction of the first housing 61. The arrangement and the size of the positioning holes 63*c* may be designed as appropriate. Instead of forming the positioning holes 63*c*, the plurality of positioning pins 64 that protrude forward may be fixed to the first end surface 61*c*.

As illustrated in FIGS. 4 and 5, a boss 61*d* and six suction passages 61*e* are formed in the first housing 61. The boss 61*d* is formed in a cylindrical shape extending around the driving axis O as the center axis and protrudes forward from the rear wall 61*a*. An insertion hole 61*f* is formed at an end of the boss 61*d*. As illustrated in FIG. 4, the second radial bearing 27 and the shaft sealing member 29 are provided inside the boss 61*d*, similarly to the compressor in the first embodiment.

As illustrated in FIG. 5, the suction passages 61*e* are each formed in a long hole shape extending in the circumferential direction of the first housing 61. The suction passages 61*e* extend through the first housing 61 in the front and rear direction of the compressor. The suction passages 61*e* are arranged at regular intervals in the circumferential direction of the first housing 61. Note that the shape and the number of the suction passages 61*e* may be designed as appropriate.

In the first housing 61, the suction passages 61*e* are each shifted relative to the bolt insertion holes 63*a*, the fixing holes 63*b*, and the positioning holes 63*c* in the circumferential direction of the first housing 61. That is, in the first housing 61, the suction passages 61*e* are each disposed between the corresponding bolt insertion hole 63*a* and the corresponding fixing hole 63*b* in a circumferential direction of the first end surface 61*c*, and by extension, in the circumferential direction of the first housing 61. More specifically, in the first housing 61, the bolt insertion hole 63*a*, the suction passage 61*e*, and the fixing hole 63*b* are arranged in this order in a rotational direction R1 of a rotor 8*b* and the driving shaft 5 illustrated in FIGS. 5 and 8. Note that in FIG. 5, the driving shaft 5 is drawn by an imaginary line for ease of explanation.

As illustrated in FIG. 4, the second housing 62 is disposed at a front of the first housing 61. The second housing 62 has a front wall 62*a* and a peripheral wall 62*b*.

The front wall 62*a* is located at a front end of the second housing 62 and extends in a radial direction of the second housing 62. The peripheral wall 62*b* is formed in a cylindrical shape extending around the driving axis O as the center axis. The peripheral wall 62*b* is connected to the front wall 62*a* and extends rearward from the front wall 62*a*. The front wall 62*a* and the peripheral wall 62*b* cooperate to form the second housing 62, which has a bottomed cylindrical shape that is open in the rear direction of the compressor.

The second housing 62 also has a second end surface 62*c*, an attachment leg 62*d*, and an attachment leg 62*e*. The second end surface 62*c* is a rear end surface of the peripheral wall 62*b*. That is, the second end surface 62*c* is located at a rear end of the second housing 62.

Six fixing holes 66 are formed in the second end surface 62*c*. Although detailed illustrations are omitted, the fixing holes 66 are arranged at regular intervals in a circumferential direction of the second housing 62 so as to correspond to the bolt insertion holes 63*a*, are open in the second end surface 62*c*, and extend into the peripheral wall 62*b*. Thread grooves are formed in the fixing holes 66, and the housing fixing bolts 25*b* are screwed into the fixing holes 66 to be engaged with the thread grooves. Note that one of the six fixing holes 66 is illustrated in FIG. 4.

In addition, two positioning pins 64 (see FIG. 8) that protrude rearward are fixed to the second end surface 62*c*.

As illustrated in FIG. 4, the attachment legs 62*d*, 62*e* protrude from an outer peripheral surface of the peripheral wall 62*b* toward the outside of the second housing 62 in the radial direction of the second housing 62. The attachment legs 62*d* and 62*e* are disposed away from the second end surface 62*c* in the front direction of the compressor.

The second housing 62 also has a suction connection port 62*f*, a supporting portion 62*g*, and a communication port 62*h*. The suction connection port 62*f* is formed in the peripheral wall 62*b* and is located in front of the attachment legs 62*d*, 62*e*. The suction connection port 62*f* extends through the peripheral wall 62*b* in the radial direction of the second housing 62. Similarly to the suction connection port 13*c*, a pipe, which is not illustrated, is connected to the suction connection port 62*f*.

The supporting portion 62*g* and the communication port 62*h* are formed in the front wall 62*a*. The supporting portion 62*g* and the communication port 62*h* have the same configurations as those of the supporting portion 13*d* and the communication port 13*e* in the compressor of the first embodiment, respectively. The first radial bearing 24 is provided inside the supporting portion 62*g*.

In the housing 2, a gasket 20 is provided between the first end surface 61*c* of the first housing 61 and the second end surface 62*c* of the second housing 62. The gasket 20 is an example of the "sealing member" in the present disclosure. Similarly to the gasket 18, the gasket 20 is formed in a plate shape.

Although detailed illustrations are omitted, the gasket 20 has substantially the same configuration as that of the gasket 18 in the compressor of the first embodiment. That is, the gasket 20 has through holes that are aligned with the bolt insertion holes 63*a*, through holes that are aligned with the positioning holes 63*c*, and ribs that are located on an inner side of the through holes in the radial direction of the gasket 20 and make one round on the gasket 20 in a circumferential direction thereof.

The gasket 20 is formed such that the gasket 20 keeps away from the fixing holes 63*b* and portions near the fixing holes 63*b* in the first end surface 61*c* on an outer side thereof in the radial direction of the compressor. With this configuration, the gasket 20 is formed such that the gasket 20 does not overlap the fixing holes 63*b* and the portions near the fixing holes 63*b* in the first end surface 61*c* in the front and rear direction of the compressor.

Although not illustrated, in the housing 2, a gasket is also provided between the rear wall 61*a* of the first housing 61 and the third housing 15.

In the housing 2, the first, second, and third housing 61, 62, 15 and the gasket 20 are fixed by the six housing fixing bolts 25*b*. Here, when the first, second, and third housings 61, 62, 15 and the gasket 20 are fixed with each other, firstly, the second housing 62, the first housing 61, and the third housing 15 are arranged in this order from a front side of the compressor toward a rear side of the compressor. In addition, the gasket 20 is disposed between the first end surface 61*c* of the first housing 61 and the second end surface 62*c* of the second housing 62, and the gasket is disposed between the rear wall 61*a* of the first housing 61 and a front end surface of the peripheral wall 15*b* of the third housing 15.

The first housing 61 and the second housing 62 are positioned relative to each other by inserting the positioning pins 64 into the respective positioning holes 63*c*. Similarly to the first housing 61 and the second housing 62, the first housing 61 and the third housing 15 are positioned relative to each other.

Then, the housing fixing bolts 25*b* are inserted into the respective bolt insertion holes 151 from the third housing 15 toward the first housing 61. Thus, the housing fixing bolts 25*b* are inserted into the fixing holes 66 through the bolt insertion holes 151 and the bolt insertion holes 63*a*, and screwed into the fixing holes 66 formed in the second end surface 62*c* to be fixed in the fixing holes 66, so that the first, second, third housing 61, 62, 15 and the gasket 20 are fixed with each other.

In the housing 2, the inverter housing 12 is fixed to the front wall 62*a* of the second housing 62 by bolts, which are not illustrated. An aspect of fixing the inverter housing 12 to the second housing 62 is the same as that of fixing the inverter housing 12 to the first housing 13 in the compressor of the first embodiment. Thus, in the housing 2, the inverter housing 12, the second housing 62, the first housing 61, and the third housing 15 are arranged in this order from the front side of the compressor toward the rear side of the compressor.

In the housing 2, the first end surface 61*c* of the first housing 61 faces the second end surface 62*c* of the second housing 62 through the gasket 20 in the front and rear direction of the compressor. In the housing 2, the first housing 61 and the second housing 62 cooperate to form a suction chamber 2*a*. The suction chamber 2*a* is defined by the first housing 61, the second housing 62, and the gasket 20 and divided from the outside of the housing 2. Here, the gasket 20 seals the suction chamber 2*a* against the outside of the housing 2. The suction chamber 2*a* communicates with the suction connection port 62*f*. With this configuration, refrigerant is suctioned from the outside of the housing 2 into the suction chamber 2*a* through the pipe connected to the suction connection port 62*f*. In addition, the suction chamber 2*a* communicates with the suction passages 61*e*. Accordingly, the refrigerant in the suction chamber 2*a* is sucked into the compression chamber 49 through the suction passages 61*e* and the suction port 9*f*.

In the housing 2, an inverter chamber 4*a* is formed inside the peripheral wall 12*b* of the inverter housing 12 and between the front wall 62*a* of the second housing 62 and the front wall 12*a* of the inverter housing 12. The inverter 3 is accommodated in the inverter chamber 4*a*.

The electric motor 8 is formed of a stator 8*a* and the rotor 8*b*. The stator 8*a* includes a stator core 80, the first insulator 71, the second insulator 72, the plurality of coils 73, and a cover 76.

Figure 6:
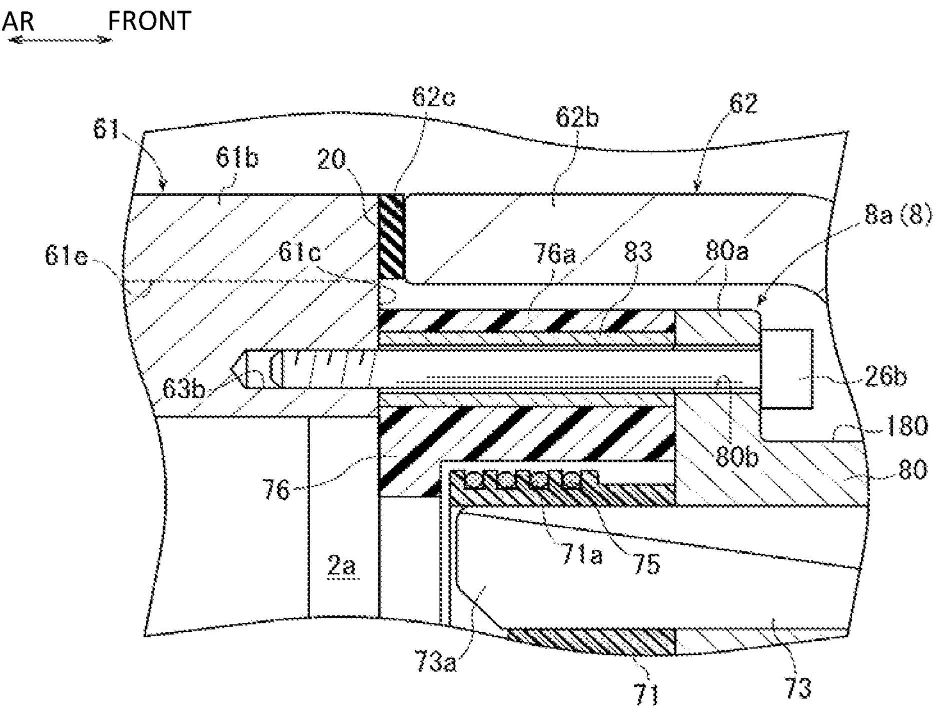
FIG. 6 is an enlarged cross-sectional view illustrating a main part including a cover and a sleeve in the electric compressor according to the second embodiment.
Figure 7:
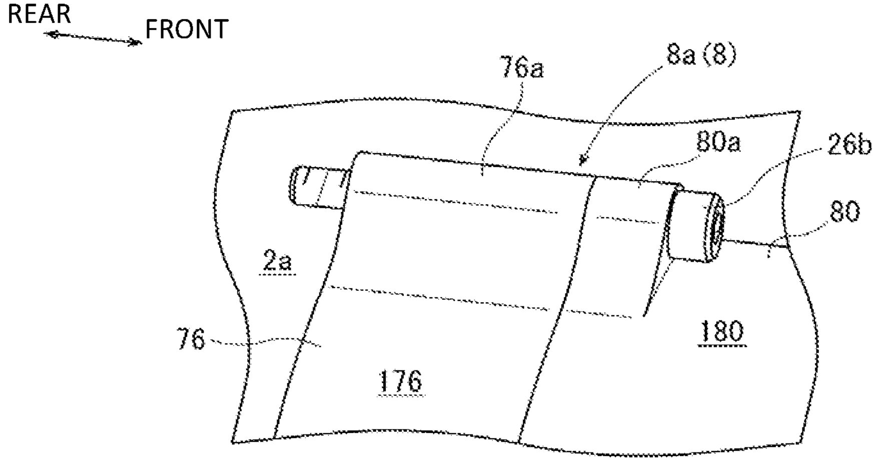
FIG. 7 is an enlarged perspective view illustrating a main part of a stator core, the cover, and a second fastener in the electric compressor according to the second embodiment.

Similarly to the stator core 70 in the compressor of the first embodiment, the stator core 80 is made of metal, and extends in a substantially cylindrical shape in the front and rear direction of the compressor around the driving axis O as the center axis. As illustrated in FIGS. 6 to 8, six attachment flanges 80*a* are formed in the stator core 80. The attachment flanges 80*a* protrude from an outer peripheral surface 180 of the stator core 80 toward an outer side of the stator core 80 in a radial direction thereof. As illustrated in FIG. 8, the attachment flanges 80*a* are arranged at regular intervals in a circumferential direction of the stator core 80. As illustrated in FIG. 6, the attachment flanges 80*a* have insertion holes 80*b* into which the stator fixing bolts 26*b* are inserted. The insertion holes 80*b* extend through the attachment flanges 80*a* in the front and rear direction of the compressor. As illustrated in FIG. 8, teeth 80*c* are formed inside the stator core 80 in the radial direction thereof. Note that an illustration of the second housing 62 is omitted as well as a shape of the stator 8*a* or the like is illustrated in a simplified manner for ease of explanation in FIG. 8.

As illustrated in FIG. 4, the first insulator 71 is disposed at a rear end of the stator core 80 and the second insulator 72 is disposed at a front end of the stator core 80.

As illustrated in FIG. 6, similarly to the cover 74 in the compressor of the first embodiment, the cover 76 is made of resin such as PPS and has an electrical insulation property and heat resistance. The cover 76 is attached to the rear end of the stator core 80, and covers a rear end of the first insulator 71 and the coil ends 73*a* on the rear side thereof in the radial direction of the compressor.

As illustrated in FIGS. 6 and 7, six holding portions 76*a* are formed in the cover 76. As illustrated in FIG. 7, the holding portions 76*a* project from an outer circumferential surface 176 of the cover 76 toward an outer side of the stator core 80 in the radial direction of the compressor. As illustrated in FIG. 6, sleeves 83 are provided inside the holding portions 76*a*. The sleeves 83 are made of metal and each formed in a cylindrical shape extending in the front and rear direction of the compressor. A length of each of the sleeves 83 in the front and rear direction of the compressor is substantially the same as that of each of the holding portions 76*a* in the front and rear direction of the compressor. The stator fixing bolts 26*b* are inserted through the sleeves 83.

In the stator 8*a*, the cover 76 is attached to the rear end of the stator core 80, and thus, the sleeves 83 and the holding portions 76*a* face the attachment flanges 80*a* of the stator core 80 in the front and rear direction of the compressor. With this configuration, the inside of the sleeves 83 communicates with the insertion holes 80*b* of the attachment flanges 80*a* while the sleeves 83 is in contact with the attachment flanges 80*a*.

As illustrated in FIG. 4, the rotor 8*b* is rotatably disposed inside the stator 8*a*. The rotor 8*b* has the same configuration as that of the rotor 7*b* in the compressor of the first embodiment, and the large diameter portion 5*b* of the driving shaft 5 is fixed by shrink fitting.

In this compressor, the stator core 80, and by extension, the stator 8*a*, is fixed to the first end surface 61*c* of the first housing 61. When the stator core 80 is fixed to the first end surface 61*c*, the stator fixing bolts 26*b* are inserted into the insertion holes 80*b* from the attachment flanges 80*a* toward the first housing 61. Then, the stator fixing bolts 26*b* are inserted into the sleeves 83 through the insertion holes 80*b*. Here, the rear ends pf the holding portions 76*a* are brought into contact with the first end surface 61*c*. This brings the sleeves 83 into contact with the first end surface 61*c* on a side opposite to the attachment flanges 80*a*. In this state, the stator fixing bolts 26*b* are screwed into the fixing holes 63*b* to be fixed in the fixing holes 63*b*. Thus, the stator core 80 is fixed to the first end surface 61*c* through the holding portions 76*a* and the sleeves 83.

Here, in the first end surface 61*c*, the fixing holes 63*b* are disposed on an inner side of the bolt insertion holes 63*a* in the radial direction of the compressor. Accordingly, as illustrated in FIG. 4, the stator core 80 is fixed to the first end surface 61*c*, and by extension, to the first housing 61, by the stator fixing bolts 26*b* on an inner side of the housing fixing bolts 25*b* in the radial direction of the first housing 61. The stator core 80 of the stator 8*a* is fixed to the first end surface 61*c* by the stator fixing bolts 26*b* on an outer side of the first and second insulators 71, 72 and the coil ends 73*a* in the radial direction of the compressor.

Thus, in the compressor, the stator 8*a* and the rotor 8*b*, that is, the electric motor 8, is disposed in the suction chamber 2*a* by fixing the stator core 80 to the first end surface 61*c*. The stator 8*a* is connected to the inverter 3 in the inverter chamber 4*a* through the connection terminal 3*c* inserted into the communication port 62*h* through the hermetically sealing member 3*d*. The small diameter portion 5*a* of the driving shaft 5 is rotatably supported by the supporting portion 62*g* through the first radial bearing 24 in the suction chamber 2*a*, and the large diameter portion 5*b* of the driving shaft 5 is rotatably supported by the second radial bearing 27 with the rear end portion of the large diameter portion 5*b* inserted into the boss 61*d*.

In this compressor, the thrust plate 51 is provided between the movable scroll 11 and the rear wall 61*a* of the first housing 61. The movable scroll base plate 11*a* and the thrust plate 51 cooperate to form the back-pressure chamber 53 in the boss 61*d*. The other configurations of this compressor are similar to those of the compressor of the first embodiment. The same configurations have the same reference numerals and detail explanations regarding the configurations will be omitted.

In this compressor, the stator core 80 of the stator 8*a* is fixed to the first end surface 61*c* of the first housing 61 by the stator fixing bolts 26*b*. Thus, in this compressor, the first end surface 61*c* serves as a fixing portion for fixing the stator 8*a*. With this configuration, in this compressor, a fixing portion exclusively for the stator 8*a* need not be formed in the peripheral wall 61*b* of the first housing 61 such that the fixing portion partly protrudes into the suction chamber 2*a*. Accordingly, similarly to the compressor of the first embodiment, it is suppressed that the first housing 61 is increased in size also in this compressor.

By the way, in this compressor, the stator core 80 is fixed to first end surface 61*c* with the holding portions 76*a* of the cover 76 disposed between the stator core 80 and the first end surface 61*c*. Here, the cover 76 including the holding portions 76*a* need be made of an insulating material such as PPS in order to ensure an insulation property. However, it is difficult to ensure stiffness in such a cover 76 made of the insulating material compared to the cover 76 made of metal. As a result, it is concerned that the holding portions 76*a*, and by extension, the cover 76, is damaged by a load applied when the stator core 80 is fixed to the first end surface 61*c*, that is, a fastening force of the stator fixing bolts 26*b* applied when the stator fixing bolts 26*b* are screwed into the fixing holes 63*b*.

As for this concern, in this compressor, the sleeves 83 made of metal are provided in the holding portions 76*a* of the cover 76, and the stator core 80 of the stator 8*a* is fixed to the first end surface 61*c* with the holding portions 76*a* and the sleeves 83 interposed between the stator core 80 and the first end surface 61*c*. That is, in this compressor, the sleeves 83 are in contact with the first end surface 61*c* and the attachment flanges 80*a* of the stator core 80 on the opposite sides of the sleeves 83. Accordingly, in this compressor, even when the holding portions 76*a* are held by the first end surface 61*c* and the attachment flanges 80*a* therebetween in the front and rear direction of the compressor by the fastening force of the stator fixing bolts 26*b* applied when the stator fixing bolts 26*b* are screwed into the fixing holes 63*b*, the holding portions 76*a* are supported by the sleeves 83. Thus, in this compressor, the holding portions 76*a*, and by extension, the cover 76, is hardly damaged when the stator fixing bolts 26*b* are screwed into the fixing holes 63*b*. As a result, in this compressor, the stator core 80 is firmly fixed to the first end surface 61*c* by the stator fixing bolts 26*b*.

In this compressor, the first housing 61 and the second housing 62 cooperate to form the suction chamber 2*a*, and the suction chamber 2*a* is divided from the outside of the housing 2 to be a space sealed against the outside of the housing 2. In addition, the gasket 20 is provided between the first end surface 61*c* and the second end surface 62*c*. With this configuration, in this compressor, the refrigerant in the suction chamber 2*a* hardly leaks to the outside of the housing 2 from a space between the first end surface 61*c* and the second end surface 62*c*.

In this compressor, each of the bolt insertion holes 63*a*, each of the suction passages 61*e*, and each of the fixing holes 63*b* are arranged in this order in the rotational direction R1 of the rotor 8*b* and the driving shaft 5. With this arrangement, the suction passages 61*e* are suitably formed in the first housing 61, so that a pressure loss of the refrigerant when the refrigerant flows through the suction passages 61*e* is suitably suppressed. Other operations in this compressor are the same as those of the compressor in the first embodiment.

In the above description, the present disclosure has been described based on the first embodiment and the second embodiment. However, the present disclosure is not limited to the above-described first embodiment and the second embodiment, and may be modified as appropriate within the scope of the present disclosure.

For example, the compression mechanism 10 may be a so-called co-rotating scroll type compression mechanism in which a first scroll and a second scroll rotate while engaged with each other. In addition, the compression mechanism 10 may be a vane type compression mechanism or a piston type compression mechanism.

In the compressor of the first embodiment, the second housing 14 and the fixed block 16 may be formed integrally with each other. In addition, the second housing 14 and the third housing 15 may be formed integrally with each other, and the fixed scroll 9, the movable scroll 11, and the fixed block 16 may be disposed inside the second housing 14 and the third housing 15 that are formed integrally.

In the compressor of the first embodiment, each of the housing fixing bolts 25*a* corresponds to the "first fastener" in the present disclosure, and each of the stator fixing bolts 26*a* corresponds to the "second fastener" in the present disclosure. However, the present disclosure is not limited to this aspect, and press-fitting pins or the like may be used as the "first fastener" and "second fastener" in the present disclosure. The same goes for the compressor of the second embodiment.

In the compressor of the first embodiment, the first housing 13, the second housing 14, and the inverter housing 12 may be fixed by a plurality of housing fixing bolts, which are inserted from the inverter housing 12, and the third housing 15, the fixed block 16, and the second housing 14 may be fixed by another plurality of housing fixing bolts different from the above-described housing fixing bolts, which are inserted from the third housing 15.

In the compressor of the first embodiment, the gasket 18 corresponds to the "sealing member" in the present disclosure. However, the present disclosure is not limited to this aspect. An O-ring or the like may be provided between the first end surface 13*f* and the second end surface 14*a*, and this O-ring or the like may be used as the "sealing member" in the present disclosure. The same goes for the compressor of the second embodiment.

In the compressor of the first embodiment or the second embodiment, carbon dioxide may be used as the refrigerant. When carbon dioxide is used as the refrigerant, pressure inside the suction chamber 1*a* or the suction chamber 2*a* becomes higher. In this case, the advantageous effects of the compressor of the first embodiment or the second embodiment become more significant. That is, in the compressor of the first embodiment or the second embodiment, the first end surface 13*f* or the first end surface 61*c* serves as the fixing portion for the stator 7*a* or the stator 8*a*, respectively, and thus, the first housing 13 or the first housing 61 need not be increased in size in order to ensure stiffness of the fixing portion such that the fixing portion tolerates the high pressure in the suction chamber 1*a* or the suction chamber 2*a*. In addition, even when the pressure in the suction chamber 1*a* or the suction chamber 2*a* becomes higher, the carbon dioxide in the suction chamber 1*a* or the suction chamber 2*a* hardly leaks to the outside of the housing 1 or the outside of the housing 2 due to the gasket 18 or the gasket 20.

In the compressor of the first embodiment, the first housing 13 may have attachment legs. In this case, the attachment legs may be preferably disposed on the peripheral wall 13*b* at a position in front of the first end surface 13*f*. In the compressor of the second embodiment, the first housing 61 may have attachment legs. In this case, the attachment legs may be preferably disposed on the peripheral wall 61*b* at a position behind the first end surface 61*c*.

In the compressor of the second embodiment, the stator core 80 is fixed to the first end surface 61*c* by the stator fixing bolts 26*b* with the holding portions 76*a* and the sleeves 83 interposed between the stator core 80 and the first end surface 61*c*. However, the present disclosure is not limited to this aspect. The holding portions 76*a* of the cover 76 in addition to the sleeves 83 may be omitted, and the stator core 80 may be fixed to the first end surface 61*c* by the stator fixing bolts 26*b* while the attachment flanges 80*a* of the stator core 80 are directly brought into contact with the first end surface 61*c* on the outer side of the cover 76 in the radial direction of the compressor.

In this compressor of the second embodiment, each of the bolt insertion holes 63*a*, each of the suction passages 61*e*, and each of the fixing holes 63*b* are arranged in this order in the rotational direction R1 of the rotor 8*b* and the driving shaft 5. However, the present disclosure is not limited to this aspect, and each of the fixing holes 63*b*, each of the suction passages 61*e*, and each of the bolt insertion holes 63*a* may be arranged in this order in the rotational direction R1 of the rotor 8*b* and the driving shaft 5.

INDUSTRIAL APPLICABILITY

The present disclosure is applicable to an air conditioner for a vehicle or the like.

What is claimed is:

1. An electric compressor comprising:
a housing;
a driving shaft;
an electric motor that rotates the driving shaft; and
a compression mechanism that is driven with rotation of the driving shaft to compress refrigerant,
the housing including a first housing extending in an axial direction of the driving shaft and a second housing having a cylindrical shape and fixed to the first housing in the axial direction,
the electric motor including a stator formed in a cylindrical shape and a rotor that is rotatable inside the stator,
the first housing and the second housing cooperating to form a suction chamber that is divided from an outside of the housing and into which the refrigerant is sucked,
the first housing having a first end surface that is an annular shape and facing the second housing in the axial direction,
the second housing having a second end surface that is an annular shape and facing the first end surface in the axial direction, a gasket having an annular shape and being provided between the first end surface and the second end surface and sealing the suction chamber against the outside of the housing, the first housing and the second housing being fixed with each other with the gasket interposed between the first end surface and the second end surface by a first fastener, wherein the stator is disposed in the suction chamber and fixed to the first end surface by a second fastener in the axial direction, the first end surface has a first hole which the first fastener is inserted through or fixed in and a second hole in which the second fastener is fixed, the second hole is open in the first end surface and is located on an inner side of the first hole in a radial direction of the first housing, the first fastener is a bolt that is located on an outer side of the stator in the radial direction of the first housing, and the second fastener is a bolt that is located on an outer side of coil ends of the stator and on an inner side of the first fastener in the radial direction of the first housing.

2. The electric compressor according to claim 1 further comprising an inverter that drives and controls the electric motor, wherein the housing includes an inverter housing in which the inverter is accommodated, and the inverter housing is fixed to the first housing or the second housing in the axial direction.

3. The electric compressor according to claim 1, wherein the stator includes a stator core formed in a cylindrical shape extending in the axial direction and the coil ends protrude from end surfaces of the stator core in the axial direction, and the stator core is fixed to the first end surface on the outer side of the coil ends by the second fastener.

4. The electric compressor according to claim 3, wherein the stator includes a cover covering one side of the coil ends, the cover being made of an insulating material, the cover has a sleeve through which the second fastener is inserted, the sleeve being made of metal, and the stator core is fixed to the first end surface with the cover and the sleeve interposed between the stator core and the first end surface.

5. The electric compressor according to claim 1, wherein the first end surface has a suction passage through which the refrigerant flows, and the suction passage is disposed between the first hole and the second hole in a circumferential direction of the first end surface.

6. The electric compressor according to claim 1, wherein at least one of the first housing or the second housing has an attachment leg attached to a mounting object, and the attachment leg is disposed away from the first end surface and the second end surface in the axial direction.

* * * * *